UNITED STATES PATENT OFFICE 2,562,806

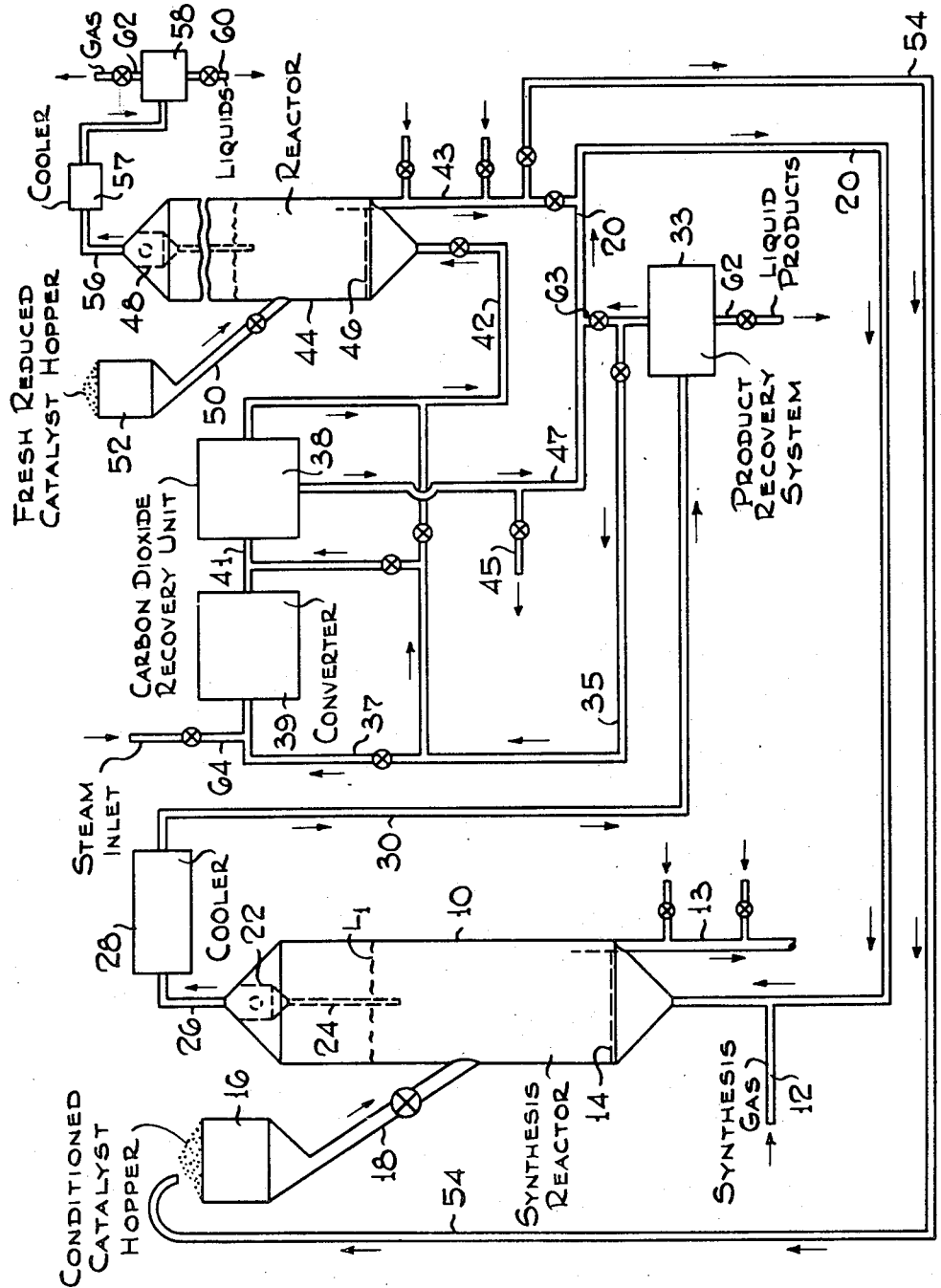

HYDROCARBON SYNTHESIS WITH CATALYST RECONDITIONING

Ivan Mayer, Summit, N. J., assignor to Standard Oil Development Company, a corporation of Delaware Application April 23, 1948, Serial No. 22,794

7 Claims. (Cl. 260—449.6)

The present invention relates to the catalytic conversion of carbon oxides with hydrogen to form valuable hydrocarbons and oxygenated organic products. More particularly, the present invention relates to a process for preconditioning a catalyst employed in the synthesis in order to produce a catalyst which is resistant to fragmentation and shows improved characteristics over catalysts not so treated.

The production of valuable hydrocarbons and oxygenated hydrocarbons from mixtures of hydrogen and oxides of carbon in the presence of catalyst of the iron group and under well defined conditions of temperature, pressure, and contact time, is well known in the art. The products obtained usually are a function of the above conditions, and vary in type, configuration, and molecular weight. Liquid paraffinic and olefinic hydrocarbons and oxygenated organic compounds are the usual products obtained in reactions of this type, but higher boiling hydrocarbons and waxes may also be produced. Secondary reaction and by-products consist chiefly of water, carbon dioxide, and carbonaceous solid materials, such as coke and fixed carbon.

The catalytic conversion of CO and $H_2$ can be carried out in fixed bed, moving bed, slurry, and fluidized solids types of operation. The advantages of the latter, such as improved heat distribution, transfer, and control, and of intimate mixing and contact of the catalyst with the reactants are well known. In these operations it has also been found that a promoted iron catalyst at somewhat more severe reaction conditions than those used with a cobalt catalyst will give a product of considerably higher olefinic content and greater suitability for use as a motor fuel than the product obtained with a cobalt catalyst. Two problems that arise in all types of operation employing an iron catalyst, but particularly in conjunction with the fluid solids type of operation, are the fouling and consequent inactivation of the catalyst by deposition of carbonaceous material or "carbon" and the tendency of the catalyst particles to disintegrate, presumably because of said carbon deposition.

The carbonaceous material deposited on the surface of such iron-base catalysts appears to be formed as a result of dissociation of CO and/or unstable hydrocarbons formed during the synthesis operation. This contamination of the catalyst occurs mainly when the synthesis reaction is productive of good yields of high octane hydrocarbons. The corresponding reaction conditions are temperatures of about 600° F. and above, and feed gas molar ratios of about 0.8:1 to 2:1 of $H_2$ to CO and pressures of 200–600 lbs. These are generally considered severe reaction conditions.

Also, during the fluid catalyst hydrocarbon synthesis process, the CO and $H_2$ not only contact the external surface of the iron but apparently penetrate to the interior of the individual particles and, as the process proceeds, carbonaceous deposits and elementary carbon form and are deposited within the catalyst, usually along the lines of structural weakness, causing a weakening of the catalyst so that, as the synthesis operation proceeds, the catalyst physically disintegrates into particles of such small size that eventually fluidization becomes difficult, that is, it becomes difficult to maintain the particles in a dense, turbulent ebullient mass by means of a gasiform fluidizing agent, here the synthesis feed gases. A satisfactory fluidized catalyst mass for the hydrocarbon synthesis reaction generally comprises particles of sizes from about 10 to 200 microns, and a particle size distribution in which up to about 30% of the particles are below 20 microns and up to about 40% are greater than 80 microns. Such a fluidized mass under severe synthesis conditions tends to undergo fragmentation with the production of fines and resulting poor fluidization behavior of the fines, and, as a result of excessive accumulation of carbon on the catalyst, both fluidization and activity of the catalyst fall off. This decline in activity and catalyst deterioration occurs not only in fluid but also in moving and fixed bed types of operation.

It is interesting to observe that although the deposition of free carbon and of carbonaceous material on the surface of the catalyst is deleterious, a certain degree of carbiding of the catalyst is highly advantageous in strengthening the catalyst and increasing yields and decreasing carbon deposition. Carbiding is generally accomplished by treating the catalyst prior to or during the synthesis reaction with gases comprising carbon monoxide. As a result of the interaction of the catalyst with the CO-containing gases, the catalyst is at least partially converted to carbides of iron principally $Fe_2C$, but also $Fe_3C$ and $Fe_4C$ etc.

Though it has been proposed hitherto to precondition catalyst prior to employment in the synthesis of hydrocarbons from carbon monoxide and hydrogen by using gases rich in carbon monoxide or with synthesis gas itself, these processes suffer from several inherent drawbacks, such as uneconomically long induction periods of 24 hours or longer, generation of gases containing high percentages of CO, which requires a separate synthesis gas generation plant, and, most important, secondary reactions occurring during the carbiding, the principal side reaction being the oxidation and contamination of the catalyst, and also formation, depending upon reaction conditions, of iron carbonyl.

It has now been found that high plant economies and other marked advantages may be realized by employing as a catalyst conditioning agent the uncondensable or "tail" gas of the hydrocarbon synthesis reaction itself. This gas, which prior to the present invention has been used to recycle to the hydrocarbon synthesis reactor or to the synthesis gas generator, or as fuel, has been found to be ideally suited as a carbiding agent. Thus it has now been found that optimum carbiding requires maintenance of carefully controlled conditioning gas compositions, which the present invention reveals. Furthermore, the carbiding gases are at pressures optimum for the most economically advantageous method of continuously carbiding fresh synthesis catalyst for use in a fluid solids type of operation. It utilizes economically a product which hitherto has been of only secondary value. Other advantages will appear subsequently.

It is, therefore, an object of the present invention to provide a continuous method for pretreating fresh iron type hydrocarbon synthesis catalyst so that coke formation and physical disintegration of the catalyst during the synthesis are retarded. It is also an object of the invention to achieve a processing economy in the hydrocarbon synthesis reaction by preconditioning iron type hydrocarbon synthesis catalyst with a gas mixture comprising the effluent gaseous stream from a hydrocarbon synthesis operation. It is also an object of the invention to precondition a finely divided iron type synthesis catalyst without oxidizing the catalyst during the preconditioning period. Other objects of the invention will appear from the subsequent description thereof.

In accordance with the invention, synthesis gas containing a hydrogen to carbon monoxide molar ratio of about 0.8–2 to 1 is fed to a hydrocarbon synthesis reactor containing catalyst preconditioned in a manner described below. The total overhead from the synthesis reactor is then cooled and the liquid reaction products are separated from the tail gas. A portion of the latter may then be passed to a water gas shift converter, where the desired ratio of $H_2$ to CO, as described below, may be attained. The $CO_2$ present in the tail gas from the reactor or from the converter may then be scrubbed and the residual high ratio $H_2/CO$ gas is then fed to a carbiding zone wherein fresh iron catalyst is fed, and wherein a relatively small quantity of hydrocarbon synthesis products are produced. The reaction conditions, particularly rate of gas throughput and temperatures in the carbiding zone are carefully controlled, as described below to prevent catalyst oxidation. The preconditioned catalyst is then picked up by the recycle gas under substantially hydrocarbon synthesis pressures and fed to the first or primary reactor.

In accordance with the invention, the preconditioning of the catalyst may be effected with gas mixtures wherein the carbon monoxide partial pressure may vary from about ½ to about 1/40 of the hydrogen partial pressure, preferably 1/8 to 1/40 of the $H_2$ partial pressure. The preferred carbiding conditions comprise pressures in the range of from about 400 to about 650 p. s. i. g., temperatures from 500° to 800° F., and residence time of from 1 to 10 hours, though pressures of from 15 to 750 p. s. i. g. and contact time of ½ to 100 hours may be employed. Generally, short time carbiding is preferable over long time carbiding in that the ratio of carbide carbon to noncarbide carbon in the catalyst is higher at the shorter treating periods. Best results are obtained when the fresh iron catalyst is essentially completely reduced prior to preconditioning. However, when the preconditioning gas mixture comprises $H_2/CO$ ratios of 25 or higher, fresh unreduced iron i. e. iron oxide may be added to the preconditioning unit, and both reduction and precarbiding may be effected simultaneously in the same equipment. During the preconditioning period relatively low yields of $C_4+$ hydrocarbons are obtained, due to the high $H_2/CO$ ratio in the preconditioning unit, the main reaction products being low boiling and gaseous hydrocarbons.

In preconditioning the fresh iron catalyst in accordance with the invention, it is highly advantageous and desirable to control the gas composition in the catalyst preconditioning reactor in such a manner so that substantially no oxidation of the reduced catalyst occurs, or iron carbonyl is formed. The principal over-all reaction forming the carbide may be formulated as $$2CO + 2Fe \rightleftharpoons Fe_2C + CO_2$$

However where pure CO or even when synthesis gas is employed as a carbiding agent, the reaction $3Fe + 4CO \rightleftharpoons Fe_3O_4 + C$ occurs to a certain extent and hence some iron oxide is formed along with the carbide. Also, carbon is formed as a result of this reaction and deposits on the catalyst. Furthermore, this oxidation is even more marked when significant quantities of carbon dioxide are present in the carbiding gas. Such $CO_2$ is normally present in small amounts in the gas coming from the synthesis gas producer unit. According to the present invention the precarbiding of the fresh catalyst is effected without significant oxidation and contamination of the catalyst by operating the catalyst preconditioning reactor in such a manner that the ratio of carbon dioxide to carbon monoxide in the effluent gases leaving the preconditioning vessel are, for the temperature of operation, below the ratio of carbon dioxide to carbon monoxide in equilibrium with iron and iron oxide. In the following table are given the maximum ratios of $CO_2$ to CO of the conditioner unit effluent gases which, at particular temperatures must not be exceeded in order to prevent oxidation of catalyst. These maximum values are obtained from the following equation:

$$\log_{10} \frac{(CO_2)}{(CO)} = (-) 0.651 + \frac{938}{T+460}$$

where

$\frac{(CO_2)}{(CO)}$ = ratio of carbon dioxide to carbon monoxide in the exit gases and T = temperature in °F.

| Temp °F. | $CO_2:CO$ |
|---|---|
| 600 | 1.72 |
| 650 | 1.66 |
| 700 | 1.43 |
| 750 | 1.32 |

Similarly the ratio of $H_2O/H_2$ must be controlled below definite values depending on the temperature of operation.

Since $CO_2$ is a product of the carbiding, carbon monoxide decomposition, and synthesis reactions occurring in the preconditioning unit, in order to maintain the $CO_2/CO$ ratio of the gases leaving the conditioning unit below the maximum shown above, it is necessary to pass the preconditioning gases through the catalyst bed at a sufficiently high rate to suppress the formation of $CO_2$ and prevent excessive conversion of CO to $CO_2$ in accordance with these reactions shown as follows:

(1) $\quad 2CO \rightleftharpoons CO_2 + C$ (2) $\quad 2CO + \dfrac{n}{2} H_2 \rightleftharpoons (CH_n) + CO_2$ (3) $\quad 2CO + 2Fe \rightleftharpoons Fe_2C + CO_2$ Preferably the throughput rate of the $H_2+CO$ mixture through the precarbiding unit is greater than 100 cubic feet (standard) per hour per pound of iron catalyst. However, increase in pressure and temperature in the catalyst preconditioning unit requires higher v./w./hr./values to keep conversion down and maintain the desired low $CO_2/CO$ ratios in the conditioning effluent gases.

One of the desirable economic features of the present invention is that the gases used in the preconditioning of the catalyst are waste tail gases from the hydrocarbon synthesis reactor, which normally are of only secondary value as fuel. Such gaseous mixtures may vary in content of hydrogen and carbon monoxide depending upon the conversion level maintained in the synthesis reactor and the composition of the fresh feed gases. The tail gas from the synthesis plant recovery unit contains mainly hydrogen, carbon monoxide, carbon dioxide, water vapor, and hydrocarbon gases containing less than three carbon atoms. For efficient operation the hydrocarbon synthesis unit is generally operated to effect a conversion of $H_2+CO$ in the fresh feed from about 85 to 95%. The residual gases therefore contain from 5 to 15% of the $H_2+CO$ supplied to the reactor. Under these conditions the CO conversion will be about 75–99%, the $H_2$ conversion 75–95%. The utilization, therefore, of $H_2$ and CO in the effluent stream from the synthesis plant is good processing economy.

Having set forth the general nature, advantages, and objects of the invention, the latter will best be understood from the more detailed description hereinafter, in which reference will be made to the accompanying drawing which is a diagrammatic representation of a system suitable for carrying out a preferred embodiment of the invention.

Referring now in detail to the drawing, 10 is a fluid catalyst hydrocarbon synthesis reactor, preferably in the form of a vertical cylinder with a conical base and having a grid or screen 14 located in the lower section to effect good gas distribution. Within reactor 10 there is present finely divided iron type hydrocarbon synthesis catalyst of any suitable composition known in the art and having particle sizes ranging from about 10 to 200 microns. Fresh synthesis gas mixture comprising carbon monoxide and hydrogen from any suitable source and under any desired pressure is passed through line 12 into reactor 10. This gas mixture has a molecular ratio of hydrogen to carbon monoxide varying between 0.8 and 2.5 to 1 preferably 1.5–1.8 to 1. The gas enters reactor 10 below grid or distribution plate 14. From catalyst supply hopper 16 fresh catalyst, conditioned in a manner described below is passed through line 18 into hydrocarbon synthesis reactor 10.

The linear velocity of the gases within reactor 10 is kept within the approximate range of about 0.3 to 5 ft. per second, preferably within an upper limit of 1.5 ft. per second. Under these conditions the catalyst assumes the form of a dense turbulent mass, having a well defined upper level $L_1$ and an apparent density of about 30 to 150 pounds per cubic foot depending upon fluidization conditions. The pressure within reactor 10 is kept within the approximate range of 150 to 700 p. s. i. g., preferably between 250 and 600 p. s. i. g. and the temperature maintained within the reaction vessel is kept within approximate limits of 450° F. and 800° F., preferably between 500° F. and 700° F.

The heat transfer characteristics of the fluidized mass permit the maintenance of relatively uniform temperature conditions throughout the fluidized system in reactor 10. Surplus heat may be withdrawn and any heat required for starting up the process may be supplied by any conventional means.

Due to the phenomenon of hindered settling of the catalyst particles, only a small portion of the latter is carried into the zone above level $L_1$. The portion of reaction vessel 10 above level $L_1$ serves as a catalyst disengaging zone. Catalyst particles enter the disengaging zone, are separated from the reaction vapors and unreacted synthesis gases by passage through solid separating equipment 22 which may be a cyclone or other means of gas-solid separation. The separated solid particles are returned to the dense bed by means of dip pipe 24. Vaporous reaction products and unreacted gases are withdrawn from reactor 10 through line 26 to cooler 28 and thence through line 30 to product recovery system 33 wherein hydrocarbons and compounds containing three and more carbon atoms are substantially separated and removed via line 62. From recovery system 33 a portion of the uncondensed gases are withdrawn via lines 63 and 35 and a portion recycled to hydrocarbon synthesis reactor 10 via lines 63 and 20. The gas free propane and heavier hydrocarbons upon leaving recovery system 33 may then be passed through lines 35 and 37 to water gas shift converter 39. In converter 39 any conventional catalyst such as iron, promoting the conversion of carbon monoxide and steam into carbon dioxide and hydrogen may be employed. Steam for this reaction may be admitted through line 64. The purpose of passing the tail gas from the synthesis through the shift converter is to control the hydrogen to carbon monoxide ratio of the tail gas to be used in the precarbiding step and to insure a desirable high hydrogen pressure in the preconditioning unit. Such control is particularly desirable where the carbon monoxide conversion in reactor 10 was not at a high level or when the hydrogen conversion was at high levels.

From shift converter 39 the gases now rich in hydrogen and containing substantial quantities of carbon dioxide are passed through line 41 to carbon dioxide scrubber 38. In carbon dioxide scrubber 38 any well known process for removing $CO_2$ such as by passing the gases through an alkaline hydroxide or through an amine scrubbing system may be employed. However, in certain cases, it may be desirable to by-pass the water gas shift converter unit or the CO₂ scrubbing unit or both. The gases from stripper 38 now substantially free of CO₂ and H₂O are passed through line 42 to the lower portion of catalyst conditioning reactor 44. Reactor 44 is similar in construction to hydrocarbon synthesis reactor 10, having a lower conical portion wherein is located a distribution grid 46 and gas solid separating equipment 48.

From fresh catalyst supply hopper 52 fresh iron type catalyst which is preferably completely reduced is admitted through line 50 to reactor 44. The velocities of the gases admitted through line 42 are controlled so that a dense fluidized mass similar in general characteristics to that in hydrocarbon synthesis reactor 10 is formed. The temperature of the exothermic preconditioning reaction is controlled between 500° and 800° F. and is preferably held within the limits of 600° and 700° F. Above grid 46 a catalyst withdrawal line 43 equipped with "aeration" taps is used to withdraw conditioned catalyst from preconditioning vessel 44 and to pass the same to hydrocarbon synthesis reactor 10. The catalyst may be passed either via line 54 into conditioned catalyst hopper 16 and thence to reactor 10 or it may be transferred directly to reactor 10 through lines 43 and 20, being carried by the reactor recycle gas stream. The catalyst mass within preconditioning reactor 44 is maintained in a turbulent ebullient state by being fluidized by the gasiform carbiding medium and is subjected to treatment with the conditioning gas for a period of between 1 to 10 hours. In order to prevent oxidation of the catalyst, the gas flow is so controlled that the ratio of CO₂ to CO of the gas leaving reactor 44 through line 56 has a CO₂ to CO ratio below that shown in the preceding table. During the conditioning period, the vaporized hydrocarbon synthesis reaction products formed within preconditioning unit 44 are continuously removed after separation of catalyst fines in equipment 48 through line 56 and passed through cooler 57 and separator 58.

Liquid products may be removed from separator 58 through line 60 for further processing and the vaporous portion may be removed through line 62 and discarded from the system for use as fuel or be further processed in any desired manner. CO₂ may be removed from carbon dioxide recovery unit 38 and passed through line 47 to recycle gas line 20 in order to reduce the recycle requirements of inert materials in the hydrocarbon synthesis reactor. Some CO₂ may also be withdrawn from line 47 through line 45 and be discarded.

The system as described admits of numerous modifications apparent to those skilled in the art. Thus it may be desirable to use as a carbiding preconditioning agent the total tail gas from hydrocarbon synthesis reactor 10 either with or without subjecting such gases to a water gas shift reaction and a carbon dioxide scrubbing operation. Also if the hydrogen to carbon monoxide ratio in the tail gas from reactor 10 is of the desired composition, shift converter 39 may be by-passed. Furthermore, although this preconditioning treatment has been described at length, for the catalyst employed in a fluid solid hydrocarbon synthesis operation, both the hydrocarbon synthesis unit and the preconditioning unit may be operated with fixed bed catalyst in a manner known per se. When a catalyst has been preconditioned in the manner described and is then employed in normal hydrocarbon synthesis operations wherein the ratio of hydrogen to carbon monoxide of the fresh feed gas is maintained within the limits of 2 to 1 to 0.8 to 1, high yields of desirable C₄+ hydrocarbons are obtained coupled with good resistance of the catalyst to fragmentation. As required, spent catalyst may be removed from reactor 10 by withdrawal of the whole or part of the catalyst through withdrawal line 13, which extends into reactor 10 above grid 14.

For example, in a certain test run iron catalyst not preconditioned, yielded about 165 cc. of C₄+ hydrocarbons per cubic meter of hydrogen plus carbon monoxide consumed, whereas preconditioned catalyst yielded about 175 cc. of C₄+ hydrocarbons per cubic meter of hydrogen plus carbon monoxide consumed. The synthesis conditions were, a temperature of 650° F., pressure of 400 p. s. i. g., feed rate of 20 v./hr./w., (H₂+CO standard cubic feet per hour per pound of iron catalyst) and an H₂ to CO feed ratio of 1.79. The CO conversion was 98% and hydrogen conversion 89.3%. A comparison of the disintegration and carbon formation rates with and without prior precarbiding of the catalyst is given by the following table:

| | Non-Carbided | Carbided |
|---|---|---|
| *Disintegration Rate* | | |
| 0-20 Micron particles formed/100 hours/100 lbs. of 20+ micron iron catalyst in reactor | 22 | 12 |
| *Carbon Formation Rate* | | |
| Grams carbon/cubic meter H₂+CO consumed | 0.6 | 0.2 |

While this catalyst preconditioning does not prevent the deposition of carbon in the hydrocarbon synthesis reactor, the treatment reduces the rate of deposition of carbon on the catalyst and notably prolongs the useful life of the same. Thus by the economic utilization of the tail gas of the present invention, low coke production and catalyst disintegration, high hydrocarbon yields and good selectivities, and low synthesis recycle requirements are obtained.

What is claimed is:

1. In the process of synthesizing hydrocarbons and oxygenated hydrocarbons by reacting together a synthesis gas comprising carbon monoxide and hydrogen in contact with a fluidized mass of iron catalyst in a reaction zone, the improvement resulting in maintaining the catalyst at a high activity level and at the same time repressing the tendency of the catalyst to undergo fragmentation, which comprises, contacting a fluidized mass of iron synthesis catalyst in a catalyst conditioning zone with substantially carbon dioxide-free effluent gas containing hydrogen and carbon monoxide from a hydrocarbon synthesis reaction zone wherein synthesis gases are catalytically converted, subjecting said catalyst to the influence of said effluent gas for a sufficient period of time to convert a substantial portion of the iron to iron carbide while passing said gas through said zone at throughput rates preferably greater than about 100 standard cubic feet per hour per pound of catalyst, whereby formation of carbon dioxide and iron oxide within said zone is suppressed, withdrawing and passing the thus treated catalyst to a hydrocarbon synthesis zone, reacting said catalyst with a gas mixture comprising carbon monoxide and hydrogen in synthesis proportions and under synthesis conditions, withdrawing valuable synthesis products and tail gases, passing said last-named gases through a carbon dioxide removal zone, and passing the thus treated tail gases to said catalyst conditioning zone.

2. The process of claim 1 in which the temperature employed in the catalyst conditioning zone is of the same order of magnitude as that employed in the synthesis zone.

3. The process of claim 1 in which the carbiding of the catalyst is carried out at pressures within the limits of 60 to 600 p. s. i. g.

4. The process of claim 1 wherein said effluent gases prior to the precarbiding operation are substantially freed of water.

5. The process of claim 1 in which said effluent gases from said hydrocarbon synthesis zone fed to said conditioning zone comprises a mixture wherein the carbon monoxide partial pressure is maintained within the limits of one half to one fortieth of the hydrogen partial pressure.

6. The process of claim 5 in which the carbon monoxide partial pressure in said catalyst conditioning zone is maintained at about one eighth to one fortieth of the hydrogen partial pressure.

7. The process of claim 1 in which the ratio of $CO_2/CO$ in the effluent gases from said catalyst conditioning unit is maintained below the values given by the equation $$\log_{10} \frac{CO_2}{CO} = (-)\,0.651 + \frac{938}{T+460}$$

where T is the temperature in °F. and $$\frac{CO_2}{CO}$$

is the ratio of carbon dioxide to carbon monoxide in the effluent gases.

IVAN MAYER.

REFERENCES CITED

The following references are of record in the file of this patent:

UNITED STATES PATENTS

| Number | Name | Date |
|---|---|---|
| 2,251,554 | Sabel | Aug. 5, 1941 |
| 2,300,787 | Murphree | Oct. 17, 1944 |
| 2,369,548 | Elian | Feb. 13, 1945 |
| 2,409,235 | Atwell | Oct. 15, 1946 |
| 2,445,796 | Millendorf | July 27, 1948 |
| 2,461,570 | Roberts | Feb. 15, 1949 |

FOREIGN PATENTS

| Number | Country | Date |
|---|---|---|
| 110,032 | Australia | Mar. 6, 1940 |